United States Patent

McIntosh et al.

[15] 3,704,348

[45] Nov. 28, 1972

[54] SERVICE OBSERVING SYSTEM

[72] Inventors: Alexander Charles McIntosh, Oak Harbor; Maurice Irvin Smith, Kirkland, both of Wash.

[73] Assignee: Tel-Tone Corporation, Kirkland, Wash.

[22] Filed: Nov. 6, 1970

[21] Appl. No.: 87,464

[52] U.S. Cl...........................179/175.2 C, 179/1 MN

[51] Int. Cl...............................................H04m 3/22

[58] Field of Search...........179/175.2 C, 1 MN, 2 DP

[56] References Cited

UNITED STATES PATENTS

| | | | |
|---|---|---|---|
| 3,420,968 | 1/1969 | Hays | 179/175.2 C |
| 3,401,396 | 9/1968 | Wolf et al. | 179/2 DP |

*Primary Examiner*—Kathleen H. Claffy
*Assistant Examiner*—Douglas W. Olms
*Attorney*—Christensen, Sanborn & Matthews

[57] ABSTRACT

To allow an observer at any remote subset on a telephone network to observe the quality of service provided to customers in a local area thereof, a service observing unit is connected to each line and trunk to be observed at the local area and to an incoming trunk from an adjacent central office. When the remote observer dials a connector number at the central office assigned to the service observing unit, an observer line connector connects the unit to the remote observer and transmits an identity tone thereto. The remote observer must then dial a security access code comprising a plurality of multi-frequency signals with established inter-signal spacing in a given sequence within a predetermined time period, or a timing and disconnect circuit within the unit releases the connection established by the observer line connector. If a correct code has been dialed, an inhibit signal is provided to the timing and disconnect circuit and an idle tone is transmitted to the remote observer. A plurality of selectors and connectors, one for each trunk or line to be observed, are then enabled by a reset signal. The first of these observed trunks or lines to have a calling signal thereon is detected by its corresponding selector which then supplies an inhibit signal to the remaining selectors and connects its line or trunk through its connector to an amplifier, and a hybrid bridging network to the remote observer. To select another line or trunk, the observer dials the last multi-frequency signal of the security access code so that a reset signal is supplied to all the selectors. To disconnect, the remote observer may place his subset on-hook or dial a disconnect multi-frequency signal. A solid-state embodiment of the unit is also discussed, as is a modification allowing selective access by the remote observer to a plurality of trunk or line groups.

16 Claims, 6 Drawing Figures

INVENTORS
ALEXANDER C. McINTOSH
MAURICE I. SMITH
BY Christensen, Sanborn & Matthews
ATTORNEYS INVENTORS
ALEXANDER C. McINTOSH
MAURICE I. SMITH
BY Christensen, Sanborn & Matthews
ATTORNEYS INVENTORS
ALEXANDER C. McINTOSH
MAURICE I. SMITH
BY Christensen, Sanborn & Matthews
ATTORNEYS INVENTORS
ALEXANDER C. McINTOSH
MAURICE I. SMITH
BY Christensen, Sanborn & Matthews
ATTORNEYS

SERVICE OBSERVING SYSTEM

FIELD OF THE INVENTION

This invention relates to a service observing system for monitoring the quality of service provided to telephone customers, and, more particularly, to such a system which allows an observer at any remote subset on a telephone network to observe the service provided at a local area thereof.

BACKGROUND OF THE INVENTION

It has long been the practice for telephone companies to observe the quality of service provided to their customers. Service observing systems have been devised which allow a trained service observer to monitor the activity on one or a plurality of trunks or lines which are located in one geographical area of a telephone network. Typical applications for service observing systems include the monitoring of PBX or Centrex installations at customer locations or of local offices.

These systems almost universally have been of a type requiring a separate service observing station which is connected to the lines and trunks to be observed via a dedicated line or trunk. In simple installations, the service observer may be located at the area where service is to be observed and may bridge a high-impedance subset across each line or trunk to be monitored. In more sophisticated systems, the service observing station may be geographically separated from the observed local area and connected thereto by a switching network and one or a plurality of high-quality observing trunks.

The design of sophisticated observing systems has progressed to a point where practically any quantity associated with telephone service can be monitored automatically, such as the quality of a connection provided to the customer, the quality of operator assistance in those locations where attendant positions are provided, the number dialed by the customer, and so forth. While automated monitoring of this type is advantageous in many respects, the information that can be obtained often does not truly record the degree of customer satisfaction with the service being provided. At present, the monitoring of calls by a trained service observer is still the most reliable indicator to customer satisfaction.

With the systems now in use, the requirement that the service observer be located either at the area to be observed or at a remote observing station which is connected by a line or a dedicated trunk to the lines and trunks to be observed has limited severely the applications in which service observing has been used, for it is difficult to justify a cost of training and maintaining service observers at every such location. In addition, the more sophisticated prior systems have been expensive to implement, as they require dedicated observing trunks and in addition use costly and expensive relay switching networks.

A system has been proposed which would allow the service observer to be located at any single subject of the telephone network and to be connected to a desired line or trunk by correctly accessing a service observing unit located in proximity to a group of such trunks and lines. Each unit would include circuits blocking unauthorized access thereto, while allowing the remote observer to select which one of the trunks or lines is to be monitored. From a theoretical standpoint, such a system is definitely advantageous over those others of the prior art in that one service observer can monitor the quality of service at a plurality of remote locations, as long as a service observing unit has been previously installed.

However, this system has not found widespread acceptance. For example, the system has been embodied in relay switching networks which include costly components requiring constant maintenance after installation. To carry out the many functions that must be accomplished if unauthorized access to the service observer unit is to be blocked and to allow the remote observer to selectively access for observation a particular trunk or line, each unit must include a large number of switches and relays which, in combination, are unreliable. Because of the number of switches and relays required, each service observing unit must be installed permanently at its observing location and is therefore uneconomical for situations in which service observing is not required for long periods of time.

To block unauthorized access, each service observing unit has associated therewith a security access code which is established by various connections of the switches and relays therein. If the security access code is somehow compromised, the unit must be rewired by a competent technician.

In short, while the basic idea of providing remote service observing via the common telephone network is meritorious, the system previously proposed has not won widespread acceptance because of its expense and relative inflexibility.

It is therefore an object of this invention to provide a service observing system which allows an observer to monitor a plurality of trunks and lines at a remote location through the common telephone network.

It is a further object of this invention to provide such a service observing system including at least one service observing unit which is connected to a group of trunks and lines to be observed and which is accessed by a call placed through a central office associated therewith.

It is yet a further object of this invention to provide such a service observing unit which uses reliable, inexpensive solid-state components which are assembled into a relatively compact, portable package for permanent or temporary installation in conjunction with a group or groups of observed trunks and lines.

It is another object of this invention to provide such a service observing unit whose security access code is easily changed by unskilled operators if compromised.

It is yet another object of this invention to provide such a service observing unit which automatically disconnects itself from the incoming trunk of its central office if accidentally called by an unauthorized party.

It is still another object of this invention to provide such a service observing unit which connects an observed trunk or line to the remote observer at the instant a call is initiated thereon.

SUMMARY OF THE INVENTION

These objects and others are achieved, briefly, by the provision of means recognizing a security access code in which a plurality of multi-frequency signals must be dialed, after the service observing unit is first reached, in a correct sequence, with correct inter-signal spacing, and within a predetermined time period, by means automatically disconnecting the service observing unit if such a security access code is not correctly dialed, and by a plurality of selector and connector means which are connected to the trunks and lines to be observed and which make connections to the remote observer at the instant a call is initiated thereon, if the service observing unit has been previously accessed.

BRIEF DESCRIPTION OF THE DRAWINGS

The aforementioned objects and others will become immediately apparent to those skilled in the art by consideration of the following portion of the specification, taken in conjunction with the accompanying drawings in which.

DESCRIPTION OF A PREFERRED EMBODIMENT

Figure 1:
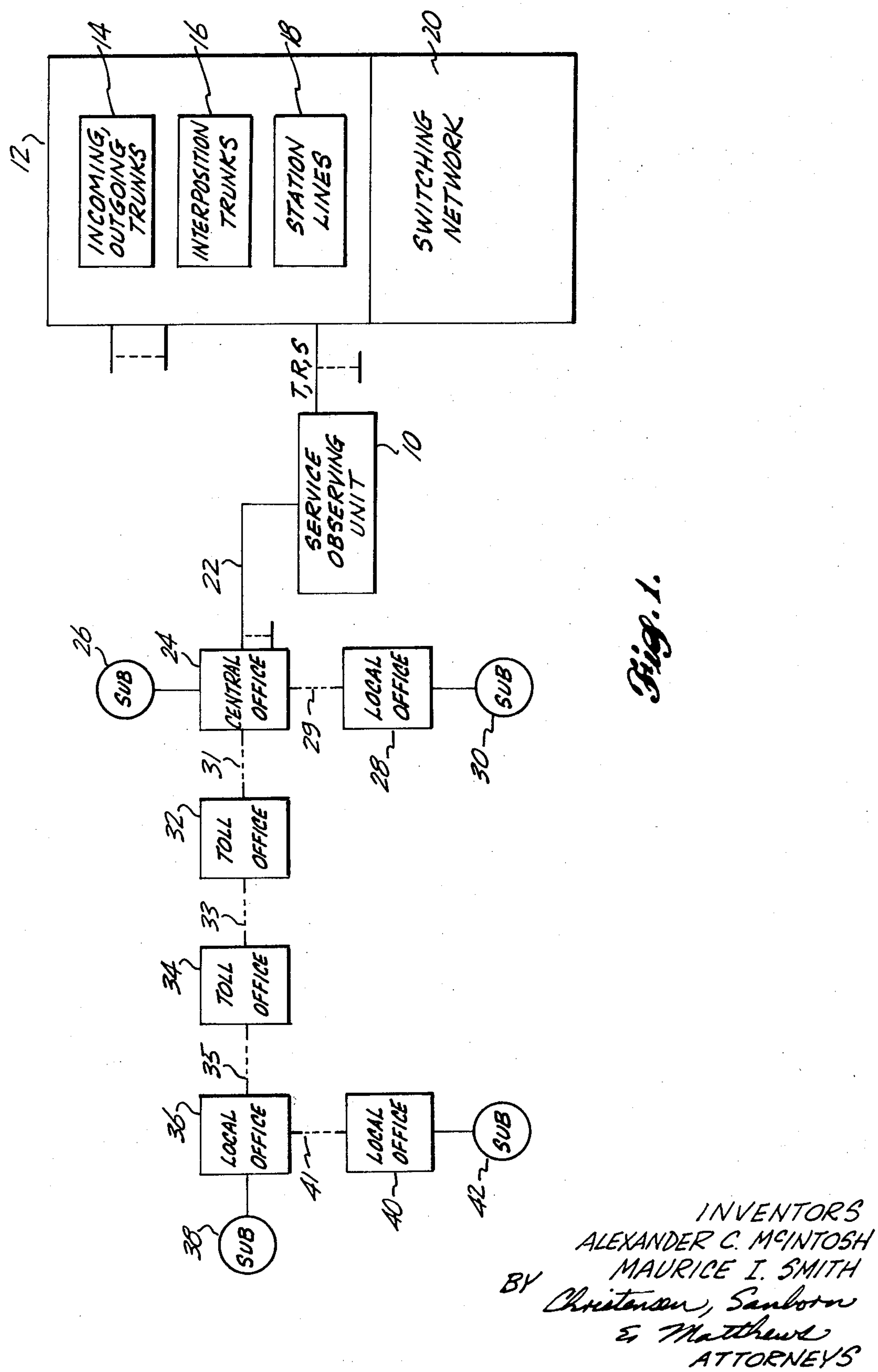
FIG. 1 is a block diagram of a typical telephone network showing the relative placement of a remote service observer and a service observing unit.

With particular reference now to FIG. 1, a service observing unit 10 constructed according to the teachings of this invention is associated with a local station 12 which may include a plurality of incoming and outgoing trunks 14, a plurality of interposition trunks 16, a plurality of station lines 18, and a common switching network 20 connected thereto. Station 12 may be located at a local or toll office of the telephone network, at a private branch exchange system, including PBX, PABX, Centrex, or the like, or at anyplace where at least one trunk or line is available for service observing. Switching network 20 may use any commonly-known switching system, such as step-by-step, panel, crossbar, or electronic switching. As more fully explained hereinafter, the tip T, ring R, and, in some cases, the sleeve S conductors of each trunk and line to be observed in station 12 must be available for connection to the service observing unit 10.

Access is provided to the service observing unit 10 by the tip T and ring R conductors of an incoming trunk 22 which is connected to appropriate connector terminal equipment in a central office 24. Central office 24 may be any local or toll office which is in turn connected to the remainder of the telephone voice network. As illustrated in FIG. 1, this network may include a telephone subset 26 connected to central office 24, a local office 28 having a subset 30 which is connected to central office 24 via a local trunk 29, toll offices 32 and 34 and remote local offices 36 and 40. Inter-office trunks 31, 33, 35 and 41 provide interconnection between these offices. A telephone subset 38 is provided at local office 36, and a telephone subset 42 at local office 40.

The service observing unit 10 can be placed at any station 12 at which the tip, ring and sleeve conductors of the trunks and lines to be observed are made available for connection and at which an incoming trunk is available for access thereto, in addition to power supply and grounding requirements. Because of its construction, the service observing unit 10 can be used with practically any type of trunk or line and be responsive to practically any type of signalling thereon. In addition, the service observing unit 10 can be accessed from any point on the telephone network, whether it be from subsets 26, 30, 38 or 42.

To obtain access to the service observing unit 10, the remote observer must know the connector number in central office 24 which is assigned to the incoming trunk 22. In the embodiment of FIG. 1, this connector number is in the form of a standard telephone number which may be dialed directly from subsets 26 or 30, or from subsets 38 or 42 by the addition thereto of the area code assigned to central office 24. When the correct connector number has been dialed and received at central office 24, switching and line equipment therein impresses a standard ringing signal upon incoming trunk 22. The service observing unit 10 then recognizes this ringing signal and connects into the ring-tip circuit of trunk 22. Immediately after this connection is made, an identity tone is transmitted from service observing unit 10 back to the person gaining access via trunk 22 and central office 24.

Although the service observing unit 10 is thus subject to accidental connection to an unauthorized observer who dials its assigned connector number, access cannot be obtained to the trunks 14, 16 or lines 18 without the person correctly dialing a security access code assigned to the service observing unit 10. In a preferred embodiment, this security access code includes: (1) a predetermined time period after the initiation by the service observing unit of the identity tone in which the person must dial (2) at least two predetermined distinct multi-frequency signals (3) in a predetermined sequence (4) with a predetermined time spacing therebetween. If any one of the conditions 1–4 is not met, the service observing unit 10 automatically disconnects from incoming trunk 22.

If the security access code is correctly dialed by the remote observer, the service observing unit 10 locks on to the incoming trunk 22 and thereafter bridges a connection from the first trunk or line of station 12 having a calling signal thereon to the remote observer via the incoming trunk 22 and central office 24. This bridging action is taken simultaneously with initiation of the calling signal, and the connection remains until the remote observer dials a reset multi-frequency signal. The service observing unit 10 is then available for an automatic bridging connection to the next trunk or line of station 12 on which a call is placed. When service observing is completed, the remote observer then dials a disconnect multi-frequency signal which acts to release the connection of the service observing unit 10 from incoming trunk 22 and from the trunks and lines of station 12.

Accordingly, if the service observer knows the connector number, security access code, reset multi-frequency signal, and disconnect multi-frequency signal, she may carry out service observing from any point on the telephone network. Alternately, the service observer may be located at a given subset of the telephone network and may monitor the service provided at a plurality of geographically distinct stations 12, as long as a service observing unit 10 is placed at each of the stations and as long as the observer has readily available the aforementioned connector and access information for each unit.

In order to allow such great flexibility in operation, it is imperative that the security access code for each service observing unit be difficult to compromise, and that the circuitry therein be reliable and consistent in operation and adaptable to easy change of the security access code, if compromised.

Figure 2:
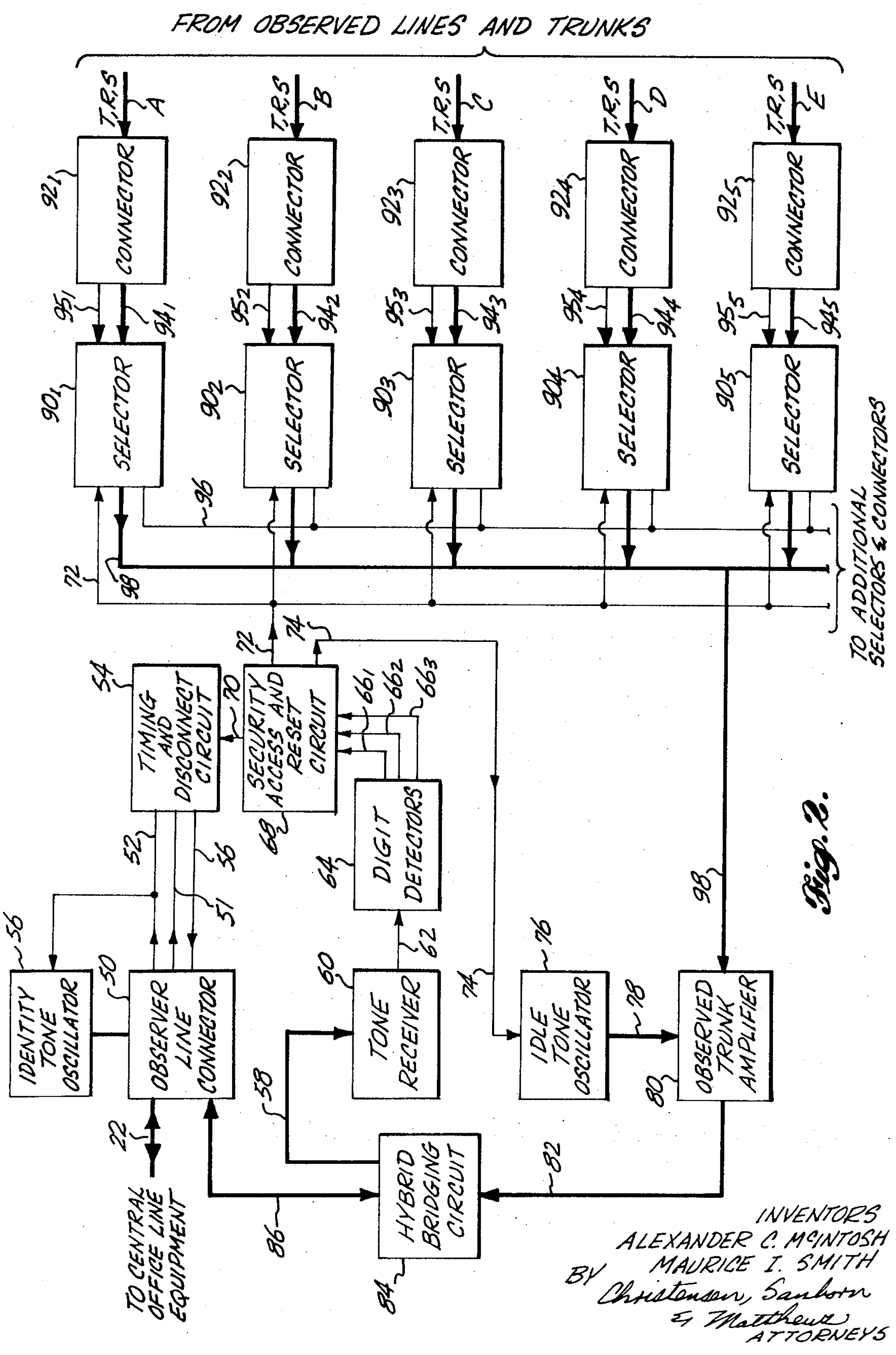
FIG. 2 is a block diagram of the service observing unit.

With particular reference to FIG. 2, a block diagram illustrates the basic functions of the service observing unit 10. In FIG. 2, voice transmission signal paths are indicated by heavy lines and control signal transmission paths are indicated by light lines. An observer line connector circuit 50 is connected across the tip and ring conductors of incoming trunk 22 when the observer has dialed the connector number assigned to the service observing unit and the line equipment in central office 24 sends a ringing signal via trunk 22. In response to this ringing signal, observer line connector circuit 50 places a bridge across the tip and ring conductors to trip the ringing signal and hold the connection via incoming trunk 22. Simultaneously, observer line connector 50 sends a control signal on a line 52 to a timing and disconnect circuit 54 and to an identity tone oscillator 56. The control signal on line 52 thus initiates the predetermined time period in the security access code and in addition causes identity tone oscillator 56 to provide a short identification tone to the remote service observer back through observer line connector 50, incoming trunk 22 and central office 24.

As mentioned previously, the remote observer must then dial the security access code multi-frequency signals in a correct sequence, having correct inter-signal spacing, within the time period established by timing and disconnect circuit 54. To determine whether or not the security access code has been correctly dialed, the incoming trunk 22 is connected to the input of a multi-frequency tone receiver 60 by observer line connector 50, line 86, hybrid bridging circuit 84 and a connection 58.

Tone receiver 60 includes means to determine whether or not the signals appearing on the connection 58 are legitimate multi-frequency tone signals, and in addition includes means converting any legitimate signal so received into a pulse waveform having a repetition rate which is lower than the frequency of the received signal but which is related thereto. This pulse waveform is coupled by a connection 62 to a plurality of digit detectors 64. Each one of the digit detectors 64 developes its own reference pulse waveform whose repetition rate corresponds to the repetition rate of the pulse waveform from tone receiver 60, when a desired multi-frequency tone signal is being received. Each of the digit detectors then compares its reference pulse waveform with the pulse waveform from tone receiver 60. If coincidence is detected therebetween, an output signal is provided. In the embodiment of FIG. 2, the output signals from the digit detectors 64 are coupled by a corresponding plurality of output connections $66_1$, $66_2$, and $66_3$, to the inputs of a security access and reset circuit 68.

One embodiment of such a tone receiver 60 and digit detectors 64 is described with reference to FIGS. 1–5 of a co-pending patent application entitled "HIGHLY SELECTIVE FREQUENCY DETECTION SYSTEM," by Alexander C. McIntosh and Maurice I. Smith, Ser. No. 867,788, filed Oct. 20, 1969, which is also assigned to the assignee of this application. The specification of that application is fully incorporated by reference herein. However, it should be clear to those skilled in the art that receiver 60 and detectors 64 can comprise other receivers and detectors known to the art, as long as the apparatus can reliably detect multi-frequency signals associated with the digits of a twin-tone dialing system and can provide a separate output signal for each legitimate multi-frequency signal thus detected. It can be readily recognized that the actuation of the service observing unit by noise, inter-modulation distortion, or the like due to improper operation of the tone receiver and digit detectors would to a large extent defeat the purpose of using a security access code.

In one embodiment, the security access code comprises first and second multi-frequency tone signals which are transmitted sequentially. Accordingly, digit detectors 64 provide first and second output signals on connections $66_1$, $66_2$ when the first and the second multi-frequency tone signals are transmitted to tone receiver 60. In addition, digit detectors 64 provide a third output signal on a connection $66_3$ when a third multi-frequency tone signal representing a disconnect digit is transmitted.

One function of security access and reset circuit 74 is to provide an inhibit output signal on a line 70 thereof to timing and disconnect circuit 54 if, and only if, the first and second output signals are provided by digit detectors 64 in the sequence noted, with proper inter-signal spacing. If the security access code is correctly entered, a gating means within the security access and reset circuit 68 provides the inhibit output signal on line 70 to inhibit the operation of timing and disconnect circuit 54. In addition, security access and reset circuit 68 is placed in a locked condition so as to be insensitive to further signals from detectors 64, with an exception to be mentioned hereinafter. Simultaneously, security access and reset circuit 68 supplies a reset signal on a line 72 which is connected to a plurality of selector circuits $90_1$, $90_2$, $90_3$, $90_4$ and $90_5$, and a signal on a line 74 to an idle tone oscillator 76.

The output from idle tone oscillator 76 is an audible idle tone which is connected to the remote observer by a line 78, an observed trunk amplifier 80, a line 82, hybrid bridging circuit 84, line 86, observer line connector 50, and the incoming trunk 22. This idle tone is provided whenever no calls are being made on the trunks and lines connected to the service observing unit 10.

If an inhibit signal is not provided by security access and reset circuit 68 during the predetermined time period of circuit 54, an output is provided thereby on line 56 to observer line connector 50 to break the connection with incoming trunk 22, thus disconnecting the service observing unit 10 from the remote observer. If, however, the timing and disconnect circuit 54 has been stopped from its disconnect operation by the production of an inhibit signal on line 70, the remote service observer is informed, by the production of the idle tone by oscillator 76, that the service observing unit 10 has been accessed correctly and that the observer will be connected to the next call initiated on the trunks and lines connected to the service observing unit 10.

The tip T, ring R, and, in some cases, the sleeve S conductors of a plurality of trunks A, B, C, D, and E are coupled to a corresponding plurality of connector circuits $92_1$, $92_2$, $92_3$, $94_4$, and $92_5$. When a call is initiated on one of the trunks A–E, as described hereinafter, a control signal is supplied by one of the leads $95_1$, $95_2$, $95_3$, $95_4$ or $95_5$ to the corresponding selector circuit $90_1$, $90_2$, $90_3$, $90_4$ and $90_5$.

For example, assume that the first call appears on trunk A. Accordingly, a control signal is supplied through connector $92_1$ and lead $95_1$ to selector $90_1$ which then acts to produce an inhibit signal on a line 96 thereof which is coupled to the remaining selectors $90_2$–$90$ to inhibit their operation. In addition, selector $90_1$ completes a voice circuit connection in the following manner. The trunk A IS COUPLED THROUGH connector $92_1$ and a lead $94_1$ to selector $90_1$. The operation of selector $90_1$ couples the lead $94_1$ to a common voice lead 98 which is connected to the input of observed trunk amplifier 80. The remote observer may then observe the quality of service provided on trunk 80 by connection through line 82, hybrid bridging circuit 84, line 86, observer line connector 50, and incoming trunk 22.

Each of the connector circuits includes a high-impedance bridge circuit and a signaling circuit. The high-impedance bridge circuit couples voice transmission on the associated trunk or line to the output line 94 thereof without impairing operation of the observed trunk or line, and without causing audible noises which could be detected by the customer using the observed trunk or line. The signaling circuit takes the initiation of a call on the associated trunk or line and provides a corresponding control signal on its output line 95. This signaling circuit may be used with practically any type of signaling commonly used on telephone lines and trunks. For example, the call may be initiated by a ringing voltage impressed across the tip and ring conductors of the trunk or line, by a negative or positive voltage impressed on the sleeve thereof, or by a voltage obtained from a spare pair of contacts on the switchhook of a telephone subset connected thereto. The aforementioned ringing voltage is commonly AC, with a frequency of 16–66 Hz in the range of 90–160 volts. The aforementioned signal appearing on sleeve leads or conductors, otherwise known as S, C, or T leads, generally comprises a negative DC voltage in manual switching systems and a positive DC voltage in automatic switching systems. In the case of the switchhook, either a positive or a negative DC voltage may be applied through the contacts.

Isolation between the tone receiver 60 and the observed line or trunk is provided by the hybrid bridging circuit 84, whose function is to couple the audible and voice signals from observed trunk amplifier 80 to the remote observer, while blocking disconnect and on-hook signals developed on the trunks or lines from actuating the circuit 68 through tone receiver 60 and detectors 64.

Because of the isolation provided by these circuits, and, more important, because the selector circuit 90 completes a bridge across the observed trunk or line at the time a call is initiated, disturbance of the observed trunk or line is minimal. In addition, the remote observer is furnished with the same information as is the party initiating a call on the trunk or line which is being observed.

When the remote observer has received enough information about the quality of service on the observed trunk, the observer dials the multi-frequency signal which corresponds to a reset digit. In the circuit of FIG. 2, the reset digit comprises the second digit of the security access code. Accordingly, digit detectors 64 provide a second signal therefrom so that security access and reset circuit 72 again provides a reset signal on line 72 to all the selectors 90 and a control signal on line 74 to idle tone oscillator 76. In the example previously referred to, selector circuit $90_1$ acts upon this second reset signal by breaking the connection between input line $94_1$ and common output line 98. At this time, the observer again hears the idle tone provided by oscillator 76. The first call initiated after the second reset signal then actuates its corresponding selector 90, which accordingly inhibits the operation of the remaining selectors and completes a voice connection from the associated connector 92 to the input of the observed trunk amplifier 80 in the same manner as described.

The remote observer may continue to observe the service provided on the trunks and lines by simply dialing the reset digit whenever a change is required. When the need for observing has ended, the observer may be disconnected from the service observing unit 10 in a number of ways.

First, the remote observer may dial the multi-frequency signal corresponding to a disconnect digit. This signal produces an output signal on line $66_3$. In response thereto, circuit 68 stops production of the reset and inhibit signals on lines 72 and 70, respectively and removes the control signal from line 74. At this time, the internal connections in selectors $90_1$–$90_5$ between lines $94_1$–$94_5$ and output line 98 are broken. Timing and disconnect circuit 54 breaks the connection to incoming trunk 22 by applying an output signal via line 56 to observer line connector 50.

Second, the remote observer may place her telephone subset on-hook. This arrangement works satisfactorily only in those situations where the central office to which the observer's subset is connected has facilities to recognize an on-hook condition and thereby release the connector circuits thereto. It is estimated that no more than 50 percent of presently-available central offices have this capability. If the on-hook condition is recognized, the connection at the central office 24 to which the service observing unit 10 is connected is also released. This action opens the loop between the tip T and ring R conductors of the incoming trunk 22. To insure disconnect, a signal is also provided from observer line connector 50 on a line 51 to timing and disconnect circuit 54 to initiate the disconnect sequence previously described.

If desired, the system illustrated in FIG. 2 may be adapted to the observing of as many trunks and lines as is desired by the provision of a separate selector and connector for each trunk or line.

The unique security access code and the circuitry for detecting such a code which is embodied in tone receiver 60, digit detector 64, security access and reset circuit 68, and timing and disconnect circuit 54, make it very difficult for an unauthorized person to gain access to the trunks and lines connected to the service observing unit 10. The time period established by circuit 54 may be short, on the order of 5 seconds or less, so as to limit the number of combinations of multi-frequency signals that may be tried by an unauthorized observer in an attempt to gain access thereto. Moreover, circuit 68 makes it imperative that the proper combination of multi-frequency signals be dialed in the proper sequence in with correct inter-signal spacing, thereby further restricting the chances of unauthorized access. Finally, if tone receiver 60 and detector 64 are of a type similar to that described and claimed in the aforementioned co-pending patent application, actuation of the circuit 68 in response to noise, distortion or other unwanted signals is unlikely.

Even if the security access code is compromised, it can be changed readily by changing the multi-frequency signals to which digit detectors 64 are respectively responsive. In the embodiment thereof disclosed in the aforementioned co-pending patent application, this change may be made by varying the reference pulse waveform generated by each of the digit detectors. Variation of the reference pulse waveforms is effected by varying the value of a variable resistor, which operation can be carried out by relatively unskilled persons.

Figure 3:
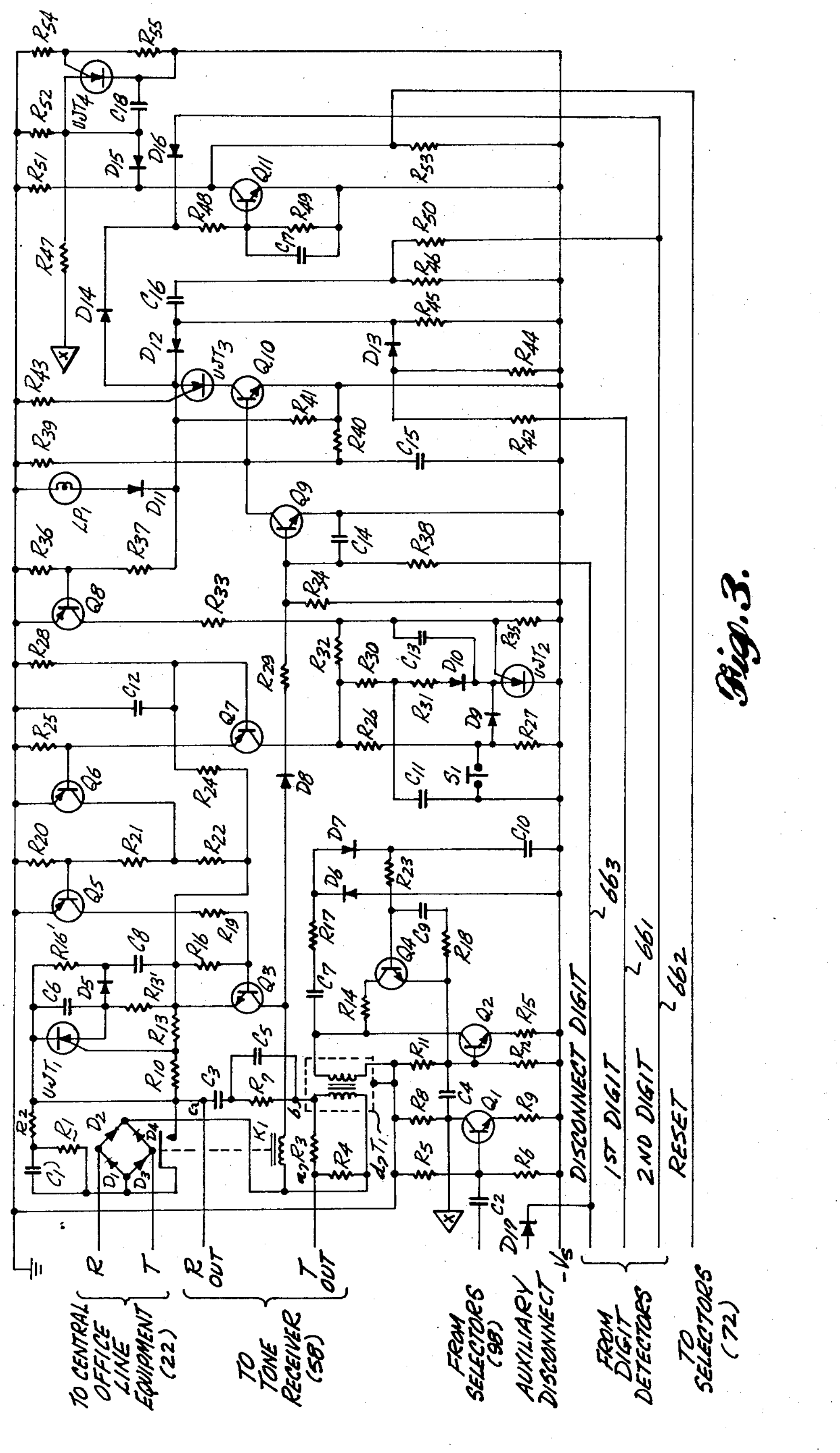
FIG. 3 is a schematic diagram of one embodiment of the function control circuits of FIG. 2.
Figure 4:
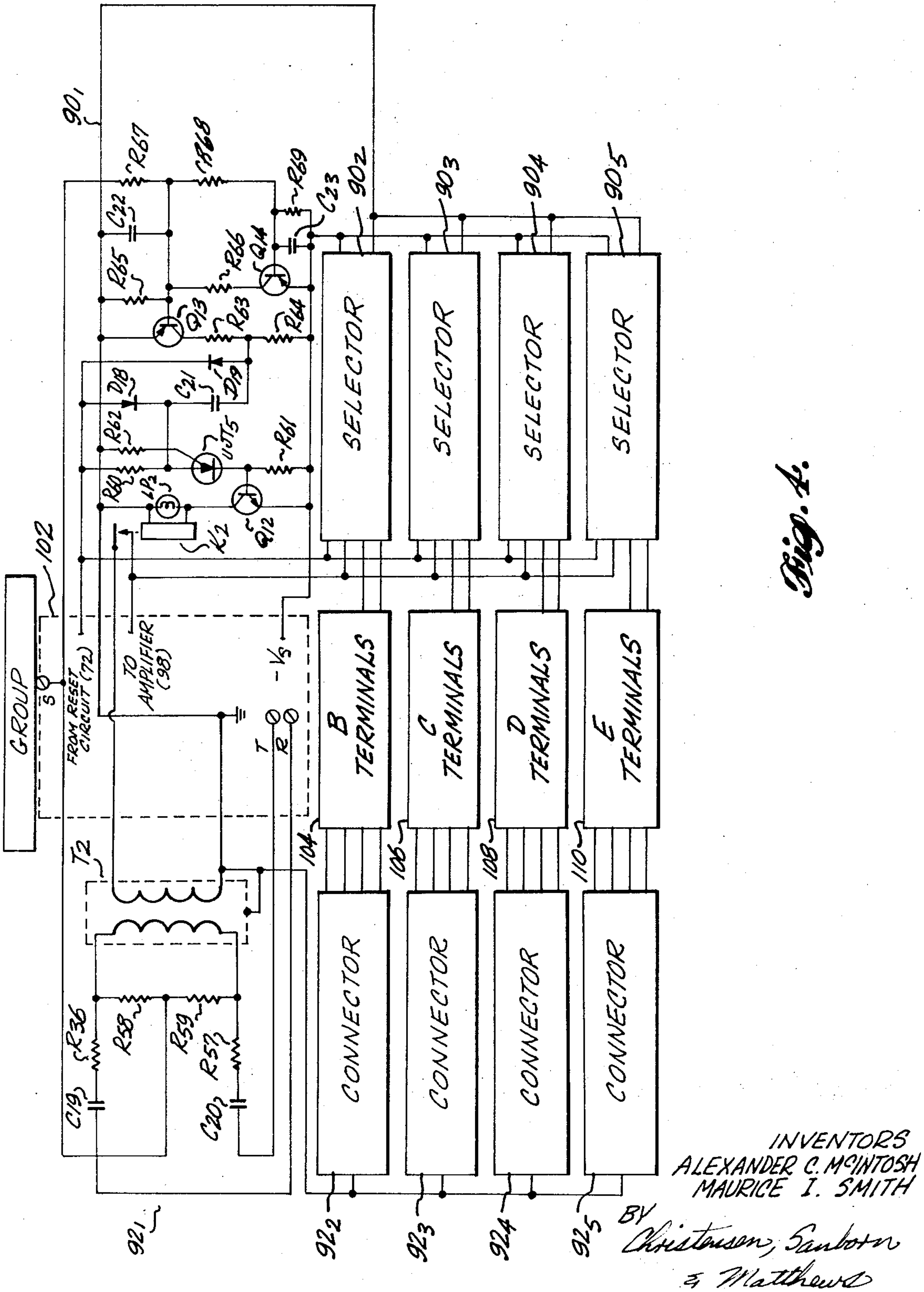
FIG. 4 is a schematic diagram of one embodiment of the selector-connector circuits of the FIG. 2.

The basic functions thus described with respect to FIG. 2 may be embodied in many types of circuits. However, for ease in maintenance, low initial cost, portability, and reliable, consistent operation under all conditions, a solid-state embodiment such as that illustrated in FIGS. 3 and 4 is preferred. This discussion is subdivided by headings for each of the elements in FIG. 2.

OBSERVER LINE CONNECTOR 50

When the remote observer dials the connector number assigned to the service observing unit 10, the associated central office 24 sends a ringing signal on incoming trunk 22. This ringing signal appears across the tip T and ring R conductors of the incoming trunk 22 and is applied across a diode bridge comprising diodes $D_1$, $D_2$, $D_3$ and $D_4$. The observer line connector 50 then senses this ringing signal and makes a connection to the incoming trunk 22 in the following manner. The negative portion of the ringing signal is coupled by diode $D_1$, capacitor $C_1$, resistors $R_2$, $R_{10}$, $R_{13}$, $R_{22}$ and $R_{21}$ to the base of transistor $Q_5$ which is normally non-conducting by virtue of a connection of the base electrode to positive ground by a resistor $R_{20}$. The negative portion of the ringing signal turns transistor $Q_5$ on, thereby connecting the positive ground at its emitter electrode to the base of a normally non-conducting transistor $Q_3$ through a resistor $R_{19}$. When positive ground is supplied thereto, transistor $Q_3$ is turned on to thereby complete a circuit between the tip T and ring R conductors of the incoming trunk 22. This circuit extends through diode $D_1$, capacitor $C_1$, resistors $R_2$, $R_{10}$, and $R_{13}$, transistor $Q_3$, the coil of a relay $K_1$, and diode $D_4$. The ringing signal then energizes relay $K_1$ so that its associated pair of contacts are closed. After this operation, a DC path between the ring R and tip T conductors is completed through diode $D_1$, the contacts of relay $K_1$, resistors $R_{10}$ and $R_{13}$, transistor $Q_3$, the coil of relay $K_1$, and diode $D_4$. This DC path functions to trip the line equipment within central office 24 so that the ringing signal is removed from the incoming trunk 22 and the central office station battery connected across the tip T and ring R conductors thereof.

The station battery provides current to the base of transistor $Q_5$ through diode $D_1$, the contacts of relay $K_1$, and resistors $R_{10}$, $R_{13}$, $R_{22}$ and $R_{21}$. Thereafter, transistor $Q_5$ holds the connection to the incoming trunk 22, through transistor $Q_3$, until transistor $Q_5$ is turned off, either by removal of the station battery from the incoming trunk or by a signal from the timing and disconnect circuit 54 to be hereinafter described.

IDENTITY TONE OSCILLATOR 56

The common junction of resistors $R_{10}$ and $R_{13}$ is connected to the gate of a programmable unijunction transistor $UJT_1$. Transistor $UJT_1$ forms the active element of identity tone oscillator 56 and may be of a type commercially available from the General Electric Company. Briefly, a programmable unijunction transistor includes an anode, a cathode, and a gate, in which the forward breakdown voltage for current flow from the anode to the cathode thereof is determined by the voltage presented to the gate.

The frequency-determining elements of identity tone oscillator 56 are capacitor $C_6$ and resistor $R_{13}'$. Together with transistor $UJT_1$, these elements comprise a ' oscillator which oscillates at a predetermined frequency as soon as transistor $Q_3$ is placed in a conducting condition and substantial current flows through resistors $R_{10}$ and $R_{13}$. This frequency should be within the audible range and one example would be 1,000 Hz.

The duration of the identity tone is determined as follows. When transistor $Q_3$ turns on, capacitor $C_8$ begins to charge through resistor $R_{16}'$ and transistor $Q_3$. When the voltage of the common junction of resistor $R_{16}'$ and capacitor $C_8$ reaches a negative voltage which is equal to or lower than the negative voltage at the common junction of capacitor $C_6$ and resistor $R_{13}'$, diode $D_5$ connected therebetween is forward biased and thereafter conducts to provide a discharge path for any charge within capacitor $C_6$. At this time, oscillation stops and the identity tone is removed from the trunk 22.

Timing and Disconnect Circuit 54 — Automatic Disconnect Operation

When transistor $Q_3$ is placed in a conducting condition, the negative voltage appearing at the common junction of resistors $R_{13}$ and $R_{22}$ is also applied through a resistor $R_{24}$ to the input of the timing and disconnect circuit 54. Specifically, resistor $R_{24}$ is coupled to the base of a normally non-conducting transistor $Q_7$. When transistor $Q_7$ turns on, the time period in which the security access code must be dialed by the remote observer is initiated, as a charging path is provided for a capacitor $C_{11}$ from positive ground to the negative supply voltage $-V_s$ through a resistor $R_{25}$, transistor $Q_7$ and resistor $R_{30}$. The length of this timing period is determined by the combination of capacitor $C_{11}$ and a second programmable unijunction transistor $UJT_2$. From the voltage developing across capacitor $C_{11}$, a signal is applied to the anode of transistor $UJT_2$ through resistor $R_{31}$ and diode $D_{10}$. Similarly, a signal is applied to the gate of transistor $UJT_2$ from the voltage at the common junction of resistor $R_{30}$ and $Q_7$ through resistors $R_{32}$ and $R_{35}$. When the voltage on the anode of transistor $UJT_2$ exceeds the forward breakdown voltage thereof, as established by the voltage on the gate, transistor $UJT_2$ conducts to provide a current path through diode $D_9$, resistor $R_{26}$, transistor $Q_7$ and resistor $R_{25}$ to the base electrode of a transistor $Q_6$. When transistor $Q_6$ turns on in response to this signal, the common junction of resistors $R_{21}$ and $R_{22}$ is coupled directly to positive ground so that transistor $Q_5$ in the observer line connector 50 is again placed in a nonconducting condition. When transistor $Q_5$ is turned off, transistor $Q_3$ is likewise turned off to break the current path through the coil of relay $K_1$. Accordingly, the DC current path between the tip T and ring R conductors of the incoming trunk 22 which is afforded by the contacts of relay $K_1$ is broken to disconnect the service observing unit 10.

Therefore, when transistor $UJT_2$ is placed in a conducting condition, the time period for the correct entry of the security access code has ended. The duration of this time period may be pre-set by appropriately choosing the values of resistors $R_{32}$ and $R_{35}$ which determine the magnitude of the voltage present at the gate of transistor $UJT_2$.

Tone Receiver 60 and Digit Detectors 64

To prevent this automatic disconnect action, transistor $UJT_2$ must be prevented from conducting by the production of an inhibit signal on line 70. This inhibit signal is generated in the following manner. The incoming trunk 22 is connected to tone receiver 60 through the hybrid bridging circuit 84. In FIG. 3, the tip T conductor of trunk 22 is connected to the tip $T_{out}$ conductor of the line 58 to tone receiver 60 through diode $D_4$ and a resistor $R_4$, and the ring R conductor of trunk 22 is connected to the ring $R_{out}$ conductor of line 58 through diode $D_1$ and the contacts of relay $K_1$.

In the embodiment being discussed, the security access code comprises first and second multi-frequency signals which are produced when the remote observer dials first and second digits, respectively, of a twin-tone signaling system. When the first digit is dialed, the first multi-frequency signal is transmitted by the telephone network, trunk 22, observer line connector 50, and the portions of hybrid bridging circuit 84 and line 58 described above, to the tone receiver 60. If the multi-frequency signal corresponds to that previously set into one of the digit detectors 64, an output signal is provided thereby on the first digit lead 66, seen in FIG. 3.

Security Access and Reset Circuit 68— Inhibit Signal

This output is in the form of a positive ground pulse and is connected to one side of a voltage divider including series-connected resistors $R_{42}$ and $R_{44}$ whose other side is connected to $-V_s$. The common junction of this divider is connected by a diode $D_{13}$ to one side of a capacitor $C_{16}$ whose other side is connected by a resistor $R_{46}$ to $-V_s$. The common junction of diode $D_{13}$ and capacitor $C_{16}$ is also connected to $-V_s$ through a resistor $R_{45}$, and to the anode of a third programmable unijunction transistor $UJT_3$ by a diode $D_{12}$. The common junction of capacitor $C_{16}$ and resistor $R_{46}$ is connected to a second digit lead $66_2$ by a resistor $R_{50}$. Finally, the gate of programmable unijunction transistor $UJT_3$ is connected to positive ground by a resistor $R_{43}$.

To produce the inhibit signal to timing and disconnect circuit 54, and more specifically, to transistor $UJT_2$, diode $D_{13}$ becomes forward-biased when a ground pulse appears on line $66_1$, thus completing a charging path for capacitor $C_{16}$ from positive ground to $-V_s$ through resistor $R_{46}$. As diode $D_{12}$ is reverse-biased, capacitor $C_{16}$ charges to a voltage above $-V_s$ determined by the potential existing at the common junction of resistors $R_{42}$ and $R_{44}$. When the positive ground pulse is removed from the first digit lead $66_1$, diode $D_{13}$ becomes reverse-biased and capacitor $C_{16}$ begins to discharge through the circuit comprising resistors $R_{45}$ and $R_{46}$. The second digit must then be dialed by the remote observer before capacitor $C_{40}$ can discharge to a predetermined value. When this second digit is correctly dialed, a positive ground pulse on the second digit line $66_2$ is applied to the negative side of capacitor $C_{16}$ through resistor $R_{50}$. At this time, the voltage at the common junction of diode $D_{12}$ and capacitor $C_{16}$ is raised to a value above positive ground, the magnitude of such value being determined by the state of discharge of capacitor $C_{16}$. This positive voltage places diode $D_{12}$ in a forward-biased condition, thereby impressing a positive voltage on the anode of programmable unijunction transistor $UJT_3$.

If the voltage thus coupled to the anode of $UJT_3$ is equal to or above the forward breakdown voltage thereof, as established by the voltage supplied to the gate of $UJT_3$ through $R_{43}$, $UJT_3$ is placed in a conducting condition. A transistor $Q_{10}$ is interposed in a connection between the cathode of $UJT_3$ and $-V_s$ and is normally enabled for conduction by a voltage divider including $R_{39}$ and $R_{40}$. The base of transistor $Q_{10}$ is in turn connected to a transistor $Q_9$ which is normally disabled from conduction by the station battery connected across trunk 22, as coupled through diode $D_4$, the coil of relay $K_1$, diode $D_8$, and resistor $R_{29}$. When the transistor $UJT_3$ is placed in a conducting condition, a circuit is completed from positive ground to $-V_s$ through resistors $R_{36}$, $R_{37}$, $UJT_3$, and transistor $Q_{10}$. Accordingly, transistor $UJT_3$ is latched on. In addition, a transistor $Q_8$, whose base is connected to the common junction of $R_{36}$ and $R_{37}$, is placed in a conducting condition. A current path is then made from a positive ground to the gate of transistor $UJT_2$ through transistor $Q_8$ and resistor $R_{33}$. Accordingly, the voltage on the gate thereof is raised so that the forward breakdown voltage of transistor $UJT_2$ is raised above the maximum anode voltage to be expected from the charging of capacitor $C_{11}$.

Transistor $UJT_2$ thus is prevented from conducting and the timing function of timing and disconnect circuit 54 is inhibited so that no disconnect signal can be applied to the observer line connector 50 through transistor $Q_6$.

In summary, the security access code is determined in the following manner. Unijunction transistor $UJT_2$, and its associated timing capacitor $C_{11}$, determine the duration of the time period starting upon the production by the service observing unit of an identity tone, in which the two digits of the security access code must be correctly dialed. The tone receiver 60, together with digit detectors 64, determines whether or not two predetermined, distinct multi-frequency signals have been correctly transmitted. The connection of the first and second digit leads to opposite sides of timing capacitor $C_{16}$, the polarity of the pulses thereon, and the connections of that capacitor to a voltage source, predetermine sequence in which the pulses on those leads must occur. The time constants involved in the charging and discharging of capacitor $C_{16}$ predetermine the required inter-signal time spacing. Finally, the connection of transistor $UJT_3$ to transistor $UJT_2$ through transistor $Q_8$ allows the inhibiting of the timing disconnect when the security access code has been correctly dialed.

Security Access and Reset Circuit 68 — Reset and Control Signals

The reset function of circuit 68 is centered about normally conducting transistor $Q_{11}$. Base current for transistor $Q_{11}$ is supplied from the positive ground source through resistors $R_{36}$, $R_{37}$, diode $D_{14}$ and resistor $R_{48}$. When transistor $UJT_3$ is latched on, the voltage at its common junction with diode $D_{14}$ approaches $-V_s$ so that diode $D_{14}$ is reverse-biased. Transistor $Q_{11}$ is placed in a non-conducting condition and its collector rises towards positive ground, as established by a voltage divider including resistors $R_{51}$ and $R_{53}$. The resulting pulse comprises the reset signal and is coupled to the reset lead 72.

Idle Tone Oscillator 76

In addition, the voltage pulse on the collector of transistor $Q_{11}$ places diode $D_{15}$ in a reverse-biased condition so to produce the control signal to idle tone oscillator 76. A fourth programmable unijunction transistor $UJT_4$ and its associated components form a relaxation oscillator of the same type as $UJT_1$ and its associated components, and $UJT_4$ oscillates as long as diode $D_{15}$ is reverse-biased and the discharge path therethrough for capacitor $C_{18}$ is blocked.

Observed Trunk Amplifier 80 — Idle Tone Signal

Transistors $Q_1$, $Q_2$ and $Q_4$ comprise the active elements of amplifier 80. The idle tone signal produced by $UJT_4$ is connected via a resistor $R_{47}$, terminals X, resistor $R_8$, and capacitor C4 to the base of transistor $Q_2$, wherein it is amplified and impressed across the primary winding of a transformer $T_1$. Automatic gain control of any signals impressed across the primary of $T_1$ is accomplished by connecting a transistor $Q_4$ in series with a resistor $R_{14}$ in a feedback path between the collector 4 and base terminals of transistor $Q_2$. The effective gain of this feedback path is varied by coupling the AC output signal at the collector of $Q_2$ to a regulating network comprising a series connection of capacitor $C_7$, resistor $R_{17}$, and the parallel connection of a diode $D_6$ and series-connected diode $D_7$ and capacitor $C_{10}$. Diode $D_7$ conducts the positive portions of the AC signal appearing at the collector at transistor $Q_2$ to capacitor $C_{10}$, and diode $D_6$ provides a discharge path for the negative portions thereof. The positive voltage appearing across capacitor $C_{10}$ is proportional to the average magnitude of the AC output signal and is coupled through a resistor $R_{23}$ to the base of transistor $Q_4$ to vary the conducting point thereof and the effective impedance of the negative feedback path.

Hybrid Bridging Circuit 84

This circuit comprises four nodes *a*, *b*, *c*, and *d*. The impedance of the incoming trunk 22 forms one leg of this bridge. The ring R conductor thereof is connected through the incoming diode bridge and the contacts of relay $K_1$ to node *c*, and the tip T conductor thereof is connected through the incoming bridge directly to node *d*. A second leg of the bridge comprises parallel-connected resistor $R_7$ and capacitor $C_5$ which, in turn, are connected in series with a capacitor $C_3$ from nodes *b* to *c* thereof. A third leg comprises resistor $R_3$ which is connected between nodes *a* and *b*, and the fourth leg comprises resistor $R_4$ which is connected between nodes *a* and *d*. The secondary winding of transformer $T_1$, which comprises the output of observed trunk amplifier 80, is connected across nodes *b* and *d*, and the line 58 to the tone receiver 60, comprising the conductors $T_{out}$ and $R_{out}$, is connected to nodes *a* and *c*, respectively.

The component values of resistors $R_3$, $R_4$, $R_7$, and the impedance of incoming trunk 22, which form the four main elements of the hybrid bridging circuit 84, must be chosen so that when a signal is applied across diagonally opposite nodes of the bridge, the other two diagonally-opposite nodes are balanced so that no signal appears thereacross. Thus, if an audible or voice signal appears across the secondary winding of transformer $T_1$ and is impressed across nodes *b* and *d*, balance occurs between nodes *a* and *c*, to which the tone receiver 60 is connected, so that none of the audible or voice signals appear thereacross. However, the signal appearing across nodes *c* and *d* is not so balanced, and therefore the audible or voice signal is coupled to incoming trunk 22. If a signal appears across nodes *c* and *d*, it is nevertheless couple to the $R_{out}$ and $T_{out}$ conductors to tone receiver 60.

Selectors 90 — Initial Reset

When transistor $Q_{11}$ turns off, the pulse comprising the reset signal developed at the common junction of resistors $R_{51}$ and $R_{53}$ is applied to each of the selectors 90. With particular reference to FIG. 4, in which only selector $\mathbf{90_1}$ and connector $\mathbf{92_1}$ are shown in detail, the reset signal is applied through a resistor $R_{60}$ to the anode of a fifth programmable unijunction transistor $UJT_5$. The voltage thus applied to the anode of $UJT_5$, although positive, is less than the forward breakdown voltage needed for conduction thereof, as established by a connection from positive ground to the gate of $UJT_5$ through resistor $R_{62}$. At this time, the transistor $UJT_5$ in each of the selectors is enabled for conduction.

Connectors 92 — Signalling

To detect the initiation of a call on observed trunk A, the connector circuit $\mathbf{92_1}$ is connected to tip T and ring R terminals of terminal group 102 to which the trunk A is connected. Similar terminal groups 104, 106, 108, 110 are provided for trunks B–E. The T terminal is connected through a capacitor $C_{20}$ and resistor $R_{57}$ to one side of the primary winding of a transformer $T_2$, and the R terminal is connected through a capacitor $C_{19}$ and resistor $R_{56}$ to the other side of the primary of transformer $T_2$. The secondary winding of transformer $T_2$ has one end coupled to positive ground and the other to the base of transistor $Q_1$ in FIG. 3 through the contacts of a relay $K_2$ in selector circuit $90_1$ and a capacitor $C_2$. Normally, relay $K_2$ is de-energized and the contact thereof are open.

The connections and elements of the remaining selectors $90_2$–$90_5$ and the remaining connectors $92_2$–92 are identical. The leads 98, 72, $-V_s$, and positive ground are common to all of the selectors 90, and the lead positive ground is common to all of the connectors 92.

When a ringing voltage is impressed upon the T and R conductors of the trunk A, resistors $R_{58}$ and $R_{59}$ connected across the primary of transformer $T_2$ provide a common junction at which the ringing voltage can be detected. Capacitors $C_{19}$ and $C_{20}$ function to block DC appearing on the trunk A from being coupled to the primary of transformer $T_2$, and resistors $R_{56}$ and $R_{57}$ provide load limiting for the ringing voltage.

Selectors 90 — Detection of First Call and Production of Inhibit Signal

The common junction of resistors $R_{58}$ and $R_{59}$ is coupled through resistors $R_{67}$ and $R_{68}$, respectively, to the bases of transistors $Q_{13}$ and $Q_{14}$ in connector 90. Capacitors $C_{22}$ and $C_{23}$ function to block transients and other various signals from the bases of transistors $Q_{13}$ and $Q_{14}$. Transistor $Q_{13}$ is placed in a conducting condition by the negative portions of the ringing voltage, thus completing a current path from positive ground to $-V_s$ through resistors $R_{63}$ and $R_{64}$.

When the reset signal on line 72 is applied to the anode of $UJT_5$, it also functions to charge capacitor $C_{21}$ through diode $D_{18}$ and resistor $R_{64}$. Prior to the turning on of transistor $Q_{13}$, the common junction of capacitor $C_{21}$ and resistor $R_{64}$ therefore has a negative polarity. When transistor $Q_{13}$ turns on, this common junction becomes positive so that the voltage at the anode of $UJT_5$ is raised above the forward breakdown voltage thereof. At this time, $UJT_5$ is placed in a conducting condition. Capacitor $C_{21}$ then discharges through $UJT_5$ and resistor $R_{61}$ so that the voltage on the reset line 72 drops due to the connection of $-V_s$ thereto through diode $D_{18}$, $UJT_5$, and resistor $R_{61}$. Although $UJT_5$ remains in a conducting condition due to current flow therethrough, the voltage at the anodes of transistors $UJT_5$ in the remaining selectors $90_2$–$90_5$ drops below the forward breakdown voltage thereof. These transistors cannot thereafter be placed in a conducting condition by the turning on of their associated transistors $Q_{13}$ due to the presence of a ringing voltage upon the associated trunk or line. In addition, the drop in voltage on reset line 72 causes diode $D_{15}$ in FIG. 3 to become forward-biased so as to thereafter shunt the charge on capacitor $C_{18}$ and stop the oscillation of idle tone oscillator 76 including transistor $UJT_4$.

Selectors 90 — Observed Trunk Connection

In addition, current flow through $UJT_5$ places transistor $Q_{12}$ in a conducting condition to thereby complete a circuit path through the coil of relay $K_2$ from positive ground to the $-V_2$. When relay $K_2$ is energized, the contacts thereof are closed so that the observed trunk A as viewed at the secondary winding of transformer $T_2$, is connected directly to the base of transistor $Q_1$ in observed trunk amplifier 80 via lead 98.

For positive portions of the ringing voltage, the operation of selector circuit $90_1$ is identical to that described for the negative portions thereof, with the exception that transistor $Q_{14}$ is first placed in a conducting condition to thereafter place transistor $Q_{13}$ in a conducting condition. It may be desirable to break the connection to $Q_{13}$ from the $R_{67}$–$R_{68}$ junction when only negative portions of the ringing voltage are to be detected, or to remove $R_{68}$ when only positive portions are to be detected. When the calling signal comprises a positive or negative voltage impressed upon the sleeve conductor of the trunk or line, actuation of selector circuit $90_1$ is accomplished in an identical manner, if the S terminal in FIG. 4 is connected directly to the sleeve lead. Actuation also may be provided by connecting the S terminal to switch or relay contacts in a switchhook signaling arrangement.

Observed Trunk Amplifier 80 — Voice Signals

Any voice signals present on the observed trunk A are thereafter coupled to the remote observer through transformer $T_2$, the contacts of relay $K_2$, and lead 98, and capacitor $C_2$ to transistor $Q_1$ within observed trunk amplifier 80. Transistor $Q_1$ functions as an input stage and the output viewed at its collector, is coupled by a capacitor $C_4$ to the input of transistor $Q_2$. The remainder of the amplifier then operates in a manner identical to that described for transmission of the idle tone signal.

SUBSEQUENT RESET SIGNALS

When the remote observer desires to observe another trunk or line associated with the service observing unit 10, the second digit of the security access code is dialed. A positive ground pulse is then provided from digit detectors 64 on the second digit lead $66_2$ in FIG. 3 and coupled via diode $D_{16}$ and resistor $R_{48}$ to the base of transistor $Q_{11}$. This positive ground pulse places transistor $Q_{11}$ in a conducting condition so that the voltage on the collector thereof becomes negative. Accordingly, the reset signal on line 72 is reversed. This negative voltage, when coupled to the anode of transistor $UJT_5$ in selector $90_1$, causes the current flow therethrough to drop below the value needed to maintain conduction therethrough. Transistor $UJT_5$ is then placed in a non-conducting condition. When the ground pulse on the second digit lead $66_2$ ceases, transistor $Q_{11}$ is again turned off. Accordingly, a reset signal is again applied to the transistors $UJT_5$ in all the selectors in the manner previously described. These transistors $UJT_5$ are then enabled for conduction when a calling signal appears on any of the associated trunks or lines. In addition, idle tone oscillator 76 is again actuated.

DISCONNECT OPERATION BY DIALING OF DISCONNECT DIGIT

When service observing has been completed, the remote observer may dial the disconnect digit representing the third multi-frequency signal. A positive ground pulse is then applied by digit detectors 64 to the disconnect lead $66_3$ in FIG. 3. This ground pulse is coupled via a resistor $R_{38}$ to the base of transistor $Q_9$ to place that transistor in a conducting condition.

Transistor $Q_9$ then couples $-V_s$ to the base of transistor $Q_{10}$, placing transistor $Q_{10}$ in a non-conducting condition and interrupting the current through transistor $UJT_3$ so that transistor $UJT_3$ is also turned off. When transistor $UJT_3$ turns off, a negative voltage is removed from the base of transistor $Q_{11}$ so that transistor $Q_{11}$ turns on, stopping the production of the idle tone by the oscillator including transistor $UJT_4$ and also turning off any transistor $UJT_5$ that is presently conducting. In this manner, any connection to an observed line or trunk is broken by the opening of the contacts of the associated relay $K_2$.

In addition, the turning off of transistor $UJT_3$ turns off transistor $Q_8$ so that the path from positive ground to the gate of transistor $UJT_2$ is broken. As a result, the gate voltage thereof drops towards $-V_s$, accordingly lowering the forward breakdown voltage so that $UJT_2$ is placed in a conducting condition. Thereafter, the connection to the incoming trunk 22 is broken in a manner identical to that described for the automatic disconnect operation in which transistor $Q_6$ is turned on, transistors $Q_5$ and $Q_3$ are turned off, and relay $K_1$ is de-energized.

ON-HOOK DISCONNECT

If the office to which the service observing unit is connected has the ability to release a subset connection from a line when the subset is placed on-hook, the service observing unit 10 then may be disconnected in the following manner. An on-hook condition at the local office to which the observer subset is connected is transmitted through the telephone network to the central office 24 to which trunk 22 is connected. In response, central office 24 opens the connector circuit to incoming trunk 22 and thereby opens the loop provided between the ring R and tip T conductors thereof. After this action, the tip T conductor rises to a positive potential. This positive voltage pulse is coupled through diode $D_4$, the coil of relay $K_1$, diode $D_8$ and resistor $R_{29}$ to the base of transistor $Q_9$ to place transistor $Q_9$ in a conducting condition so that the disconnect sequence can proceed in a manner identical to previously described when the disconnect digit is provided by the digit detectors 64.

AUXILIARY DISCONNECT

A third mode of disconnect may be provided if a positive ground pulse is applied to an auxiliary disconnect terminal of the service observing unit 10. This positive ground pulse is applied through a diode $D_{17}$ to the disconnect digit line 66$_3$ and thence to transistor $Q_9$.

MANUAL DISCONNECT

A fourth mode of disconnect is also provided. When switch $S_1$ in FIG. 3 is closed, $UJT_2$ is bypassed and current through $Q_7$ increases to turn on $Q_6$ and break the connection to the incoming trunk 22 in a manner identical to that described for the automatic disconnect operation.

The embodiment of the invention illustrated in FIG. 2 comprises a flexible design to which additional functions of service observing may be added, if desired. One of these additional functions is illustrated in FIG. 5.

In certain cases, it may be desirable that the remote service observer have the capability to select which of a group of trunks or lines is to be observed. In FIG. 5, a particular group can be chosen by the dialing of an appropriate multi-frequency signal. Specifically, two additional digit detectors 64 are provided which are set to respond to fourth and fifth multi-frequency signals impressed on line 58 to tone receiver 60. The corresponding output leads from digit detectors 64, illustrated in FIG. 5 as digit 4, lead 66$_4$ and digit 5, lead 66$_5$ are connected, along with the disconnect digit lead 66$_3$ to a control circuit 114 for a relay 112. As before, an output signal from a digit detector comprises a positive ground pulse being impressed upon its corresponding output line.

Figures 5, 6:
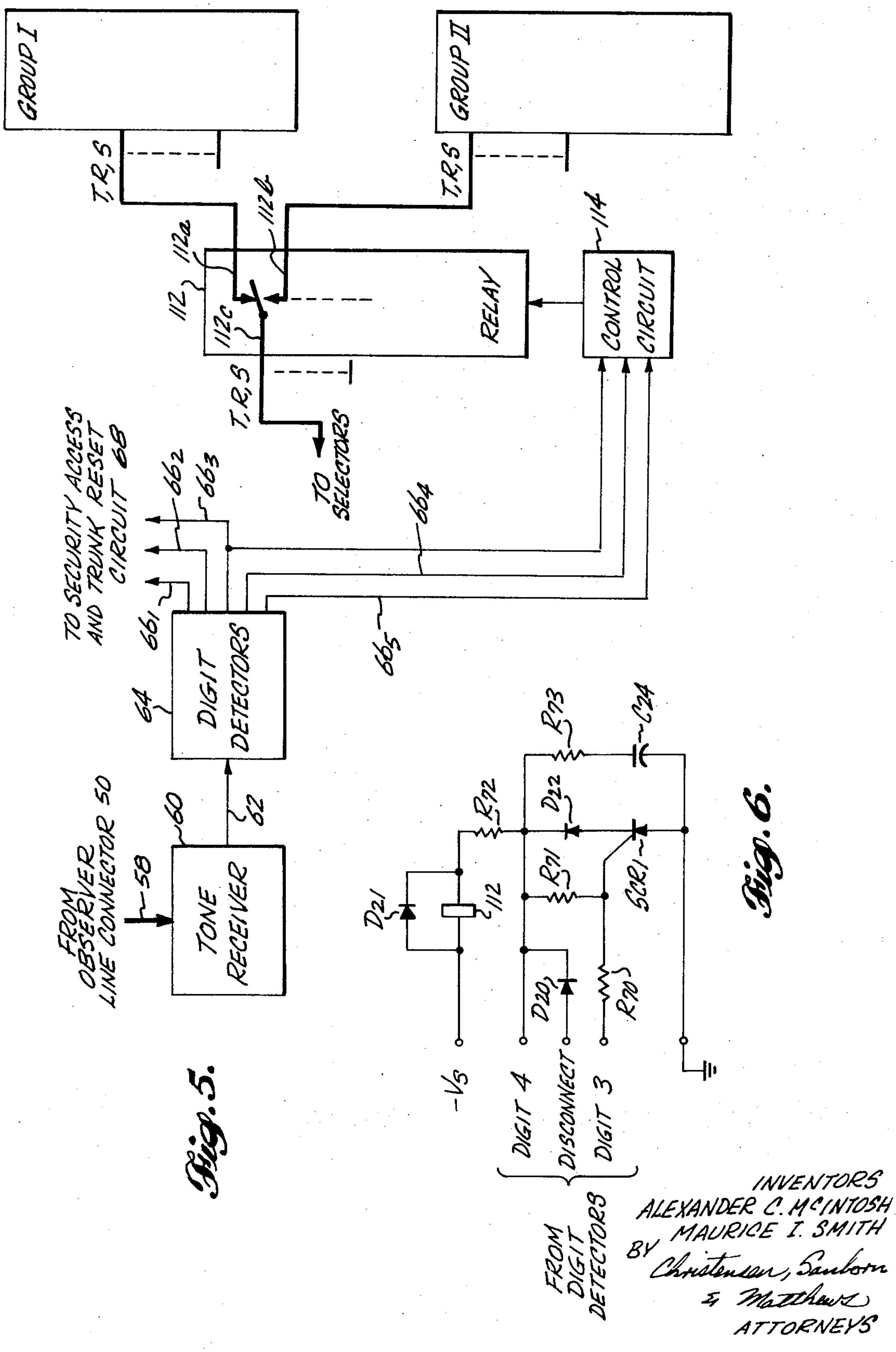
FIG. 5 is a block diagram of an addition to the basic system of FIG. 2 which allows selective access by the remote observer to a plurality of trunk line groups; and, FIG. 6 is a schematic diagram of one embodiment of the control circuit of FIG. 5.

The embodiment of relay 112 in FIG. 5 is of a multiple-pole, double-throw type. A first set of stationary contacts 112$_a$ is coupled to the tip T, ring R and sleeve S conductors of a first trunk or line group I, and a second set of stationary contacts 112*b* is connected to the tip T, ring R, and sleeve S conductors of a second trunk or line group II. The movable contacts 112$_c$ are connected to the T, R and S terminals of terminal groups 102, 104, 106, 108 and 110 in the service observing unit. Relay 112 may be normally de-energized so that the stationary contacts 112$_a$ thereof are connected to movable contacts 112$_c$ thereof.

In such a case, observing is normally made of group I. When the remote observer dials the fourth multi-frequency signal and a positive ground pulse is provided on the digit 4 lead 66$_4$, control circuit 114 energizes relay 112 so that connection is now made from stationary contacts 112*b* to movable contacts 112$_c$ and observing is made of group II. During observing, relay 112 may be de-energized again if the remote observer dials the fifth multi-frequency signal and a positive ground pulse is provided on the digit 5 lead 66$_5$ to control circuit 114. Likewise, relay 112 is de-energized when the observer dials the third multi-frequency signal corresponding to the disconnect digit and a positive ground pulse is applied on lead 66$_3$ to control circuit 112.

An embodiment of control circuit 112 is seen in FIG. 6. The relay 112 is shunted by diode $D_{21}$. The parallel combination of 112 and $D_{21}$ is connected from the $-V_s$ to positive ground through resistor $R_{72}$, diode $D_{22}$, and silicon controlled rectifier $SCR_1$. Normally, $SCR_1$ is non-conducting. When a ground pulse is applied via the digit 4 lead, a gate current for $SCR_1$ is developed from current flow from positive ground to $-V_s$ through $R_{70}$, $R_{71}$, $R_{72}$ and 112. When $SCR_1$ becomes conducting, it is latched by current flow from the positive ground connected to its anode through $SCR_1$, diode $D_{22}$, $R_{72}$ and 112 to $-V_s$. $SCR_1$ is unlatched by applying a positive ground on either the digit 5 or the disconnect leads in which case this latching current through 112 and $R_{72}$ is shunted around $SCR_1$. Resistor $R_{73}$ and capacitor $C_{24}$ provide a filter for transients incurred in the switching of $SCR_1$.

What is claimed is:

1. A service observing unit for coupling an observer at a remote subset of a voice telephone network to a plurality of trunks and lines located at one station of the network, the telephone network including an incoming trunk connected to the station, and further including means providing multi-frequency signals on the incoming trunk in response to digits dialed at the remote subset, as well as a ringing signal from that subset, comprising:

a. an observer line connector including means responsive to said ringing signal for simultaneously connecting said service observing unit to the incoming trunk and providing a first control signal, and responsive to a second control signal for disconnecting said service observing unit from the incoming trunk,
b. a timing and disconnect means including means providing said second control signal at a predetermined time after the production of said first control signal,
c. tone receiving and detecting means coupled to said incoming trunk for providing a first output signal in response to the presence of a first multi-frequency signal thereon, and for providing a second output signal in response to a presence to a second multi-frequency signal thereon, and
d. security access means including means providing an inhibit signal if, and only if, said first output signal is provided before said second output signal, and means coupling said inhibit signal to said timing and disconnect means to inhibit the production of said second signal thereby.

2. The service observing unit as recited in claim 1, wherein said tone receiving and detecting means includes means for providing a third output signal in response to the presence of a third multi-frequency signal on said incoming trunk, and said security access means includes means stopping the production of said inhibit signal thereby in response to said third output signal so that said observer line connector acts in response to said second signal from said timing and disconnect means to break said bridge connection to said incoming trunk.

3. The service observing unit as recited in claim 1, wherein said timing and disconnect means comprises:

a. a first programmable unijunction transistor having gate, anode and cathode terminals,
b. a potential source having a pair of terminals,
c. means connecting said cathode terminal to one of said terminals of said potential source,
d. means developing from said potential source a first reference potential,
e. means coupling said first reference potential to said gate terminal to establish a given forward breakdown voltage at said anode terminal thereof,
f. means responsive to said first control signal from said observer line connector for developing from said potential source a first potential whose initial value is less than said anode forward breakdown voltage and whose magnitude thereafter increases at a predetermined rate, and
g. means coupling said first potential to said anode terminal, whereby said first programmable unijunction transistor is placed in a conducting condition to produce said second control signal when said first potential exceeds the said forward breakdown voltage, 4. The service observing unit as recited in claim 3, wherein said security access means further includes means responsive to said inhibit signal for increasing said first reference potential so that said first programmable unijunction transistor cannot be placed into a conducting condition.

5. A service observing unit as recited in claim 3, wherein said inhibit signal providing means of said security access means comprises:

a. a second programmable unijunction transistor having second gate, anode and cathode terminals,
b. means coupling said second cathode terminal to one of said terminals of said potential source,
c. means developing a second reference potential from said potential source,
d. means connecting said second reference potential to said second gate terminal to establish a given forward breakdown voltage at said second anode terminal thereof,
e. means connected to said potential source for developing in response to said first output signal a second potential whose initial value is less than said second anode forward breakdown voltage but greater than that at said first terminal of said potential source,
f. means developing a third potential from said potential source in response to said second output signal,
g. means summing said second and said third potentials to produce a summed potential,
h. means coupling said summed potential to said second anode terminal, whereby, said second programmable unijunction transistor is placed in a conducting condition to produce said inhibit signal.

6. The service observing unit as recited in claim 5, wherein said inhibit signal providing means further includes means decreasing the magnitude of said second potential at a predetermined rate.

7. The service observing unit as recited in claim 1, further comprising:

a. a plurality of connector circuits, each of said connector circuits being connected across one trunk or line to be observed and including a signaling means for providing a third control signal upon the initiation of any call on said trunk or line,
b. a plurality of selector circuits, each of said selector circuits being coupled to one trunk or line through the associated one of said connector circuits and including switching means responsive to said third signal therefrom for connecting said trunk or line to an output thereof,
c. amplifier means coupling a plurality of said outputs from said selector circuits to said means within said observer line connector which bridges a connection to the telephone network incoming trunk, and
d. means responsive to the operation of any of said switching means for inhibiting the operation of said switching means in the remaining ones of said selector circuits.

8. The service observing unit as recited in claim 7, wherein said security access means further includes means producing a reset signal whenever said inhibit signal is provided thereby, and each of said selector circuits further includes means enabling said switching means therein for operation only during the production of said reset signal.

9. The service observing unit as recited in claim 8, wherein said security access means further includes means responsive to said second output signal from said tone receiving and detecting means for temporarily stopping the production of said reset signal.

7. The service observing unit as recited in claim 7, 10. comprising a hybrid bridging circuit interposed between said observer line connector, said amplifier means, and said tone receiving and detecting means and operative to block audible and voice signals provided by said amplifier means from being coupled to said tone receiving and detecting means.

11. The service observing unit as recited in claim 7, wherein said tone receiving and detecting means includes means for providing a fourth output signal in response to the presence of a fourth multi-frequency signal on said incoming trunk, and means for providing a fifth output signal in response to the presence of a fifth multi-frequency signal on said incoming trunk, and further comprising:

a. means having first and second sets of input terminals and one set of output terminals, a first group of said trunks and lines being coupled to said first set of input terminals and a second group of said trunks and lines being connected to said second set of input terminals, said means being operative to normally connect said first set of input terminals to said set of output terminals and to connect said second set of input terminals to said set of output terminals whenever a switching signal is applied thereto,
b. means connecting said set of output terminals to said plurality of connector circuits, and
c. means actuated in response to said fourth output signal for producing said switching signal, and deactuated in response to said fifth output signal.

12. An apparatus for connecting an observer at a remote subset of a telephone network to one station of the network, said station including a group of telephone circuits and being connected to an incoming trunk of the network, said telephone network including means for connecting the remote subset to the station through said incoming trunk, comprising:

a. a first connector means responsive to a first signal from the observer appearing on the incoming trunk for connecting said apparatus to the incoming trunk,
b. disconnect means for automatically disabling said connector means to break said incoming trunk connection at a predetermined time after the reception of said first signal thereby, and
c. security access means for inhibiting said disabling operation of said disconnect means, said security access means being responsive to a second signal from the observer appearing on the incoming trunk, said second signal comprising a plurality of distinct multi-frequency signals, said security access means further including a receiving means coupled to said incoming trunk and detecting said plurality of distinct multi-frequency signals to provide a distinct output signal for each signal so detected, means producing a timing signal for a predetermined time period after the production of a particular one of said output signals by said receiving means, and gating means providing an inhibit signal to said disconnect means for disabling its operation upon the concurrence of a second, distinct one of said output signals and said timing signal.

13. An apparatus as recited in claim 12, a. wherein said security access means further includes means producing a reset signal upon the inhibiting operation thereof,
b. further comprising,
   1. a second connector means which is coupled to one of said telephone circuits and which is adapted to produce a control signal upon the initiation of a call thereon, and
   2. a selector means having said one of said telephone circuits coupled thereto and being actuated in response to the concurrence of said reset signal and said control signal to connect said one of said telephone circuits to the incoming trunk.

14. An apparatus as recited in claim 12, wherein said security access means includes means responsive to a third, distinct one of said output signals from said receiving means for stopping the production of said inhibit signal by said gating means so that said disconnect means disabled said first connector means.

15. An apparatus for connecting an observer at a remote subset of a telephone network to a plurality of telephone circuits located at one station of the network, said station being connected to an incoming trunk of the network and the network including means for connecting the remote subset to the station through said incoming trunk, comprising:

a. a first connector means responsive to a first signal from the observer appearing on the incoming trunk for connecting said apparatus to the incoming trunk,
b. disconnect means for automatically disabling said connector means to break said incoming trunk connection at a predetermined time after the reception of said first signal thereby,
c. security access means for inhibiting said disabling operation of said disconnect means, said security access means being responsive to a second signal from the observer appearing on the incoming trunk and including means producing a reset signal upon the inhibiting operation thereof,
d. a plurality of second connector means, each of said second connector means being coupled to one of said plurality of telephone circuits and including means operative to produce a control signal upon the initiation of a call on its telephone circuits, and
e. a plurality of selector means, each of said selector means having one of said telephone circuits coupled thereto and including means actuated in response to concurrence of said reset signal and a control signal from that one of said plurality of said second connector means which is also coupled to said telephone circuit to connect said telephone circuit to said incoming trunk and to disable the remainder of said plurality of selector means.

16. An apparatus as recited in claim 15, wherein said security access means includes means temporarily stopping the production of said reset signal during the reception of a third signal on said incoming trunk, so that said one of said selector means that has been actuated is de-actuated to break the connection therethrough of its telephone circuit to said incoming trunk and to enable all of said selector means for further operation.

* * * * *